T. & T. H. Mitchell,
Rotary Steam Boiler.
Nº 64,895. Patented May 21, 1867.
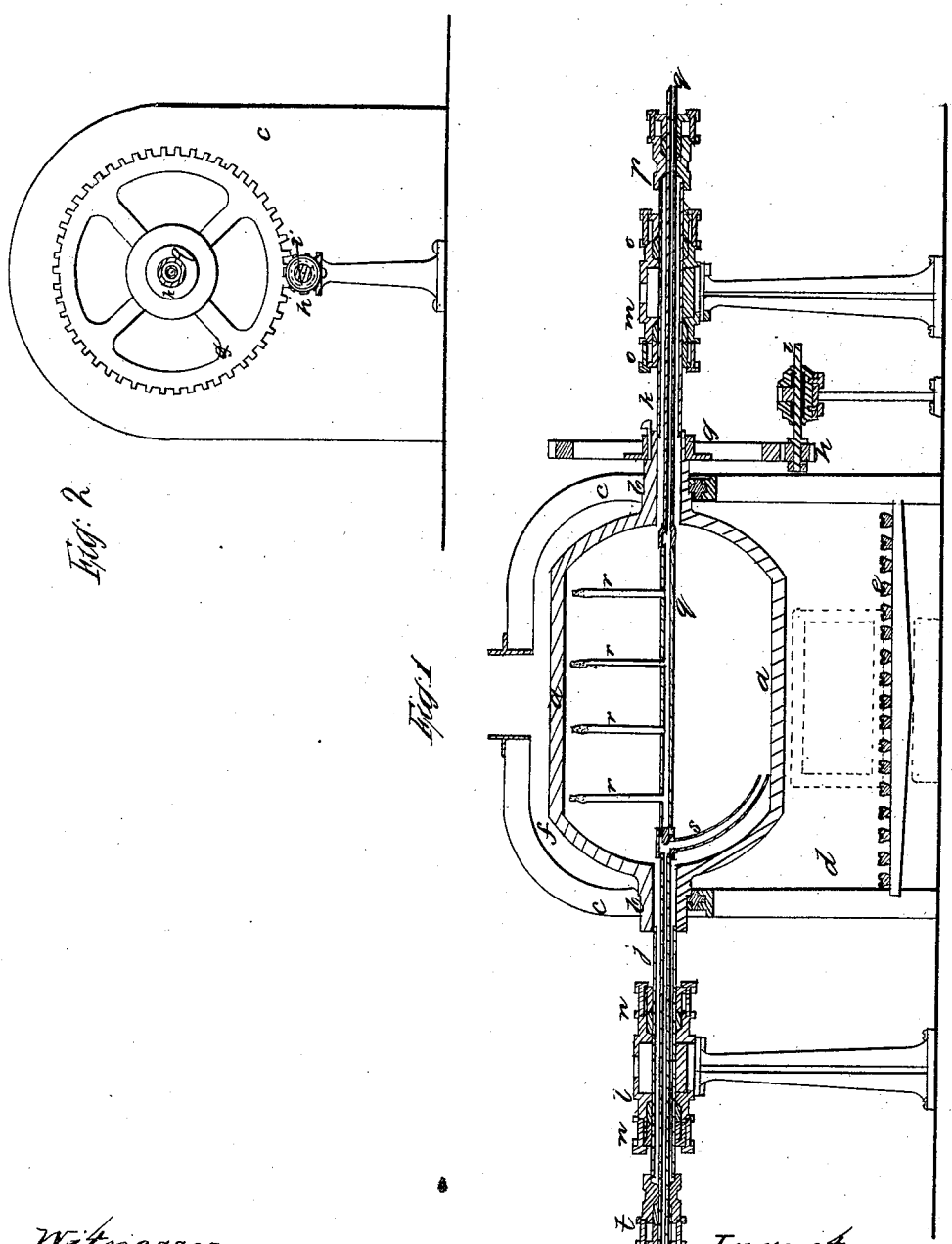
Witnesses:
Inventor:
Thomas Mitchell
Thomas H. Mitchell

United States Patent Office.

THOMAS AND THOMAS H. MITCHELL, OF ALBANY, NEW YORK.

Letters Patent No. 64,895, dated May 21, 1867.

IMPROVEMENT IN STEAM GENERATORS.

*The Schedule referred to in these Letters Patent and making part of the same.*

TO ALL WHOM IT MAY CONCERN:

Be it known that we, THOMAS MITCHELL and THOMAS H. MITCHELL, of Albany, in the State of New York, have invented certain new and useful improvements in Steam Generators; and we do hereby declare that the following is a full, clear, and exact description thereof, reference being had to the accompanying drawings, making part of this specification, in which—

Figure 1 is a longitudinal vertical section; and

Figure 2 a cross vertical section.

The same letters indicate like parts in all the figures.

Our said invention relates to improvements in that class of steam generators in which water in small quantities is injected and thrown on to the heating surface, and in the midst of steam previously generated, as distinguished from steam boilers which contain a body of water sufficient to cover the heating surface.

One of the leading objections to the introduction of that class of steam generators to which our invention relates has been the want of durability due to the deteriorating influence of unequal heat. In ordinary steam boilers the whole of the heating surface is covered with water, which by circulation rapidly carries off the heat and maintains a nearly uniform temperature; but as the heating surface in that class of generators to which our invention relates is not covered with water, and the water is only introduced in small quantities, that portion of the surface directly acted upon by the fire becomes overheated, and is thereby unduly expanded and much more expanded than the parts remote from the fire. This unequal expansion, and consequent unequal contraction, soon destroy the generator.

This serious objection we avoid by giving a rotary motion to the generator so as to heat every part of its circumference to an equal temperature, and so connecting it with the means for introducing the water that every part of its surface performs an equal portion of duty in generating steam, so that we avoid the overheating of any one part of the surface, prevent unequal expansion and contraction, and the resulting rapid deterioration, whilst at the same time we are enabled to generate a given amount of steam with considerably less surface than by the modes heretofore suggested.

In the accompanying drawings, $a$ represents the generator, which is a hollow cylindrical vessel with concavo-convex heads provided with hollow journals $b$ $b$ adapted to turn in suitable boxes in the end walls $c$ $c$ of a furnace, $d$. By preference this furnace surrounds the generator, is provided with a fire-grate, $e$, below the generator, and has a flue space, $f$, at top leading to the chimney, so that the products of combustion pass all around the generator before escaping. Outside the furnace one of the journals $b$ is provided with a large spur-wheel, $g$, which is engaged by a pinion, $h$, on a shaft, $i$, which may derive motion for rotating the generator either from the main engine, if the generator be used to generate steam for driving an engine, or from a small pumping engine, or from any other motor. And we deem it best, when the generator is to be used for driving an engine, to arrange the shaft of the pinion, in manner well known to machinists, so that it can be turned by hand when first firing up, and until the main or an auxiliary engine is started by the steam generated. To the outer end of each journal are secured cylindrical steam pipes, $j$ and $k$, so that both rotate with the generator, and they pass through and rotate in steam chests, $l$ and $m$, provided with stuffing-boxes $n$ $n$ and $o$ $o$ to prevent the escape of steam, the said pipes being pierced with holes for the discharge of steam into the steam chests. The steam generated for use is to be taken from the chest $l$ by a suitable pipe or pipes, and the chest $m$ is to be connected with the apparatus which is to regulate and control the supply of water to be introduced into the generator. To the outer end of the steam pipe $k$ is secured a stuffing-box, $p$, through which passes the water-supply pipe $q$ from the apparatus that supplies the water, which said supply pipe is stationary, and the steam pipe with the stuffing-box rotates on it, the stuffing-box preventing the escape of steam. This water pipe $q$ extends into the generator, and is provided with branch pipes $r$ which extend nearly to the upper part of the generator, where they are pierced with small holes for the discharge of the water in numerous small jets. The inner end of the said water pipe $q$ is closed, and by preference secured to the closed end of a blow-off pipe, $s$, which extends centrally through the other steam pipe, $j$, and through a stuffing-box, $t$, which closes the outer end of the said steam pipe. The inner end of this blow-off pipe curves down so that its receiving end reaches nearly to the bottom of the generator, so that any water that accumulates near the bottom can be forced out by the pressure of steam, the outer end of the said pipe being provided in the usual manner with a blow-off cock for this purpose.

From the foregoing it will be seen that as the generator rotates, and the water-supplying pipes are stationary, the heating effect of the heat of the furnace, and the cooling effect of the water, must exercise an equal influence on every part of the circumference, and hence that every part of the surface of the generator, so organized, will be equally efficient in generating steam, thus avoiding the defects heretofore found in this class of generators. And although we prefer to have two steam pipes and two steam chests, the one to supply the steam to the place where it is to be used, and the other to supply steam to the apparatus which is to regulate and control the injection of the water, that in our belief being the preferable mode of application, nevertheless one of these steam pipes and chests may be dispensed with, and the steam taken from the one chest for the several purposes required. And when so modified the blow-off pipe can pass through a stuffing-box at the outer end of the journal. And it will be obvious to engineers that any number of such generators may be used in connection by connecting the steam chests of the several generators with one common steam chest, and in like manner regulating and controlling the supply of one to the several generators by the steam taken from a steam chest common to all, or from the steam chest of each, at the will of the constructor.

What we claim as our invention, and desire to secure by Letters Patent, is—

The generator mounted so as to rotate on a horizontal or nearly horizontal axis and within a furnace, substantially as described, in combination with the pipe or pipes for supplying and jetting the water, substantially as and for the purpose set forth.

We also claim the combination of the generator rotating within the furnace, the steam pipe and steam chest, and the pipe for supplying and jetting the water within the generator, substantially as and for the purpose set forth.

We also claim the combination of the generator rotating within the furnace, the pipe for supplying and jetting the water, the steam pipe and steam chest, and the blow-off pipe, substantially as and for the purpose set forth.

We also claim the steam pipe attached to and rotating with the generator, and provided with apertures, when combined with the steam chest and stuffing-box, so that whilst rotating it will discharge the steam into the stationary chest, substantially as and for the purpose set forth.

THOMAS MITCHELL,
THOMAS H. MITCHELL.

Witnesses:
I. K. BOULWARE,
W. S. KELLEY.